(12) United States Patent
Reber

(10) Patent No.: US 11,977,416 B2
(45) Date of Patent: May 7, 2024

(54) MOUNTING RECESS FILM COVERS

(71) Applicant: ZEBRA TECHNOLOGIES CORPORATION, Lincolnshire, IL (US)

(72) Inventor: David William Reber, Cedar Park, TX (US)

(73) Assignee: Zebra Technologies Corporation, Lincolnshire, IL (US)

(*) Notice: Subject to any disclaimer, the term of this patent is extended or adjusted under 35 U.S.C. 154(b) by 221 days.

(21) Appl. No.: 17/580,301

(22) Filed: Jan. 20, 2022

(65) Prior Publication Data

US 2023/0229195 A1 Jul. 20, 2023

(51) Int. Cl.
*G06F 1/16* (2006.01)
(52) U.S. Cl.
CPC .................. *G06F 1/1656* (2013.01)
(58) Field of Classification Search
CPC ... G06F 1/1656; G06F 1/1633; H05K 5/0004; H05K 5/0008; H05K 5/0052; H05K 5/0013

USPC ...... 220/4.02, 3.94; 174/562, 563, 561, 560, 174/559; 361/724, 679.01
See application file for complete search history.

(56) References Cited

U.S. PATENT DOCUMENTS

| | | | | |
|---|---|---|---|---|
| 2011/0084579 A1* | 4/2011 | Chang | ............... | B29C 45/14778 264/447 |
| 2015/0208535 A1* | 7/2015 | Wu | ....................... | G06F 1/1656 312/223.1 |
| 2016/0187932 A1* | 6/2016 | Lin | ....................... | G06F 1/1626 277/648 |
| 2022/0354011 A1* | 11/2022 | Hadwan | ................. | H05K 5/069 |

* cited by examiner

*Primary Examiner* — Robert J Hicks

(57) ABSTRACT

A device includes: a housing having an exterior surface; a mounting recess defined in the exterior surface, the mounting recess configured to receive a fastener to couple the exterior surface of the device to an external surface; a film cover pierceable by the fastener, the film cover having (i) an inner surface affixed to a portion of the exterior surface surrounding the mounting recess, and (ii) an opposing outer surface; wherein the film cover comprises a material impermeable to an environmental contaminant to prevent entry of the environmental contaminant into the mounting recess.

19 Claims, 8 Drawing Sheets

MOUNTING RECESS FILM COVERS

BACKGROUND

Devices such as mobile computers may be compatible with various accessories, such as docks and the like. The devices may be provided with physical features on exterior surfaces thereof to engage with the accessories. However, the above-mentioned features may negatively impact device performance.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
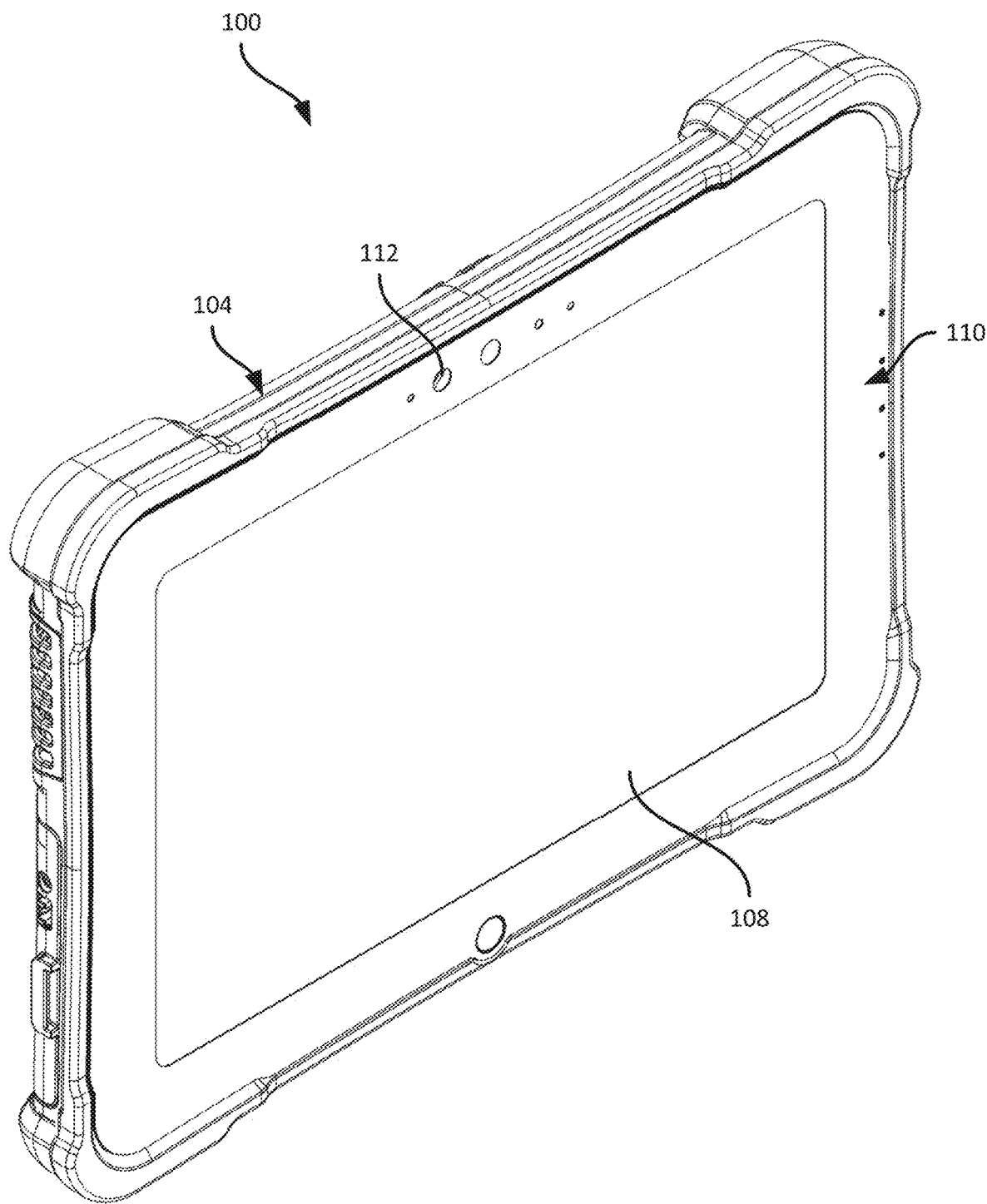
FIG. 1 is a diagram illustrating a front of a mobile computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a device including: a housing having an exterior surface; a mounting recess defined in the exterior surface, the mounting recess configured to receive a fastener to couple the exterior surface of the device to an external surface; a film cover pierceable by the fastener, the film cover having (i) an inner surface affixed to a portion of the exterior surface surrounding the mounting recess, and (ii) an opposing outer surface; wherein the film cover comprises a material impermeable to an environmental contaminant to prevent entry of the environmental contaminant into the mounting recess.

Additional examples disclosed herein are directed to a device including: a housing having an exterior surface; a mounting recess defined in the exterior surface, the mounting recess configured to receive a fastener to couple the exterior surface of the device to an external surface; a film cover pierceable by the fastener, the film cover having (i) an inner surface affixed to a portion of the exterior surface surrounding the mounting recess.

Further examples disclosed herein are directed to a film cover for a device housing, the film cover comprising: a pierceable film body having an inner surface and an outer surface, the body configured to cover a mounting recess on a portion of a device housing surface; an adhesive on the inner surface; and a graphical indicator on the outer surface.

Still further examples disclosed herein are directed to a kit, including: a set of film covers corresponding to respective portions of a device housing surface, each portion of the device housing surface having a mounting recess; each film cover having (i) a pierceable film body having an inner surface and an outer surface, the body configured to cover a mounting recess on a portion of a device housing surface, (ii) an adhesive on the inner surface, and (iii) a graphical indicator on the outer surface.

FIG. 1 illustrates a device 100, such as a mobile computer (e.g., a tablet computer, or the like). The device 100 includes a housing 104 supporting various other components of the device 100, including, for example, a display 108 on a front 110 of the device, camera aperture 112, and internal electronics (e.g., processors, memory circuits, and the like). The housing 104, as is apparent from FIG. 1, defines an exterior surface of the device 100. That is, the housing 104 defines, at least in part, the outermost surface of the device 100, which is exposed to the physical environment of the device 100. In other embodiments, the device 100 need not be a tablet computer. For example, the device 100 can be a smart phone, a laptop computer, a display peripheral such as a television panel, or the like.

Figure 2:
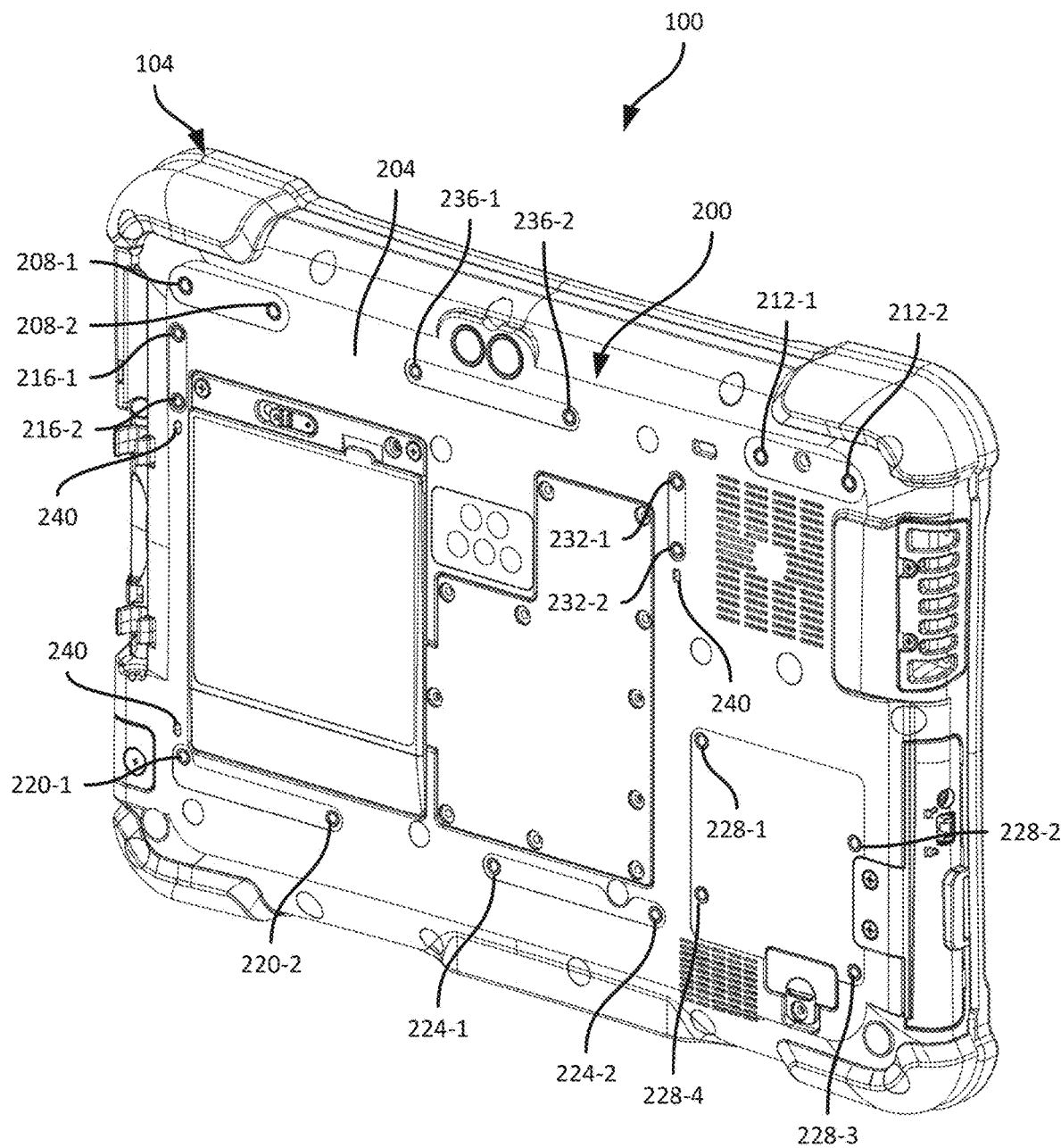
FIG. 2 is a diagram illustrating a rear of a mobile computing device.

Turning to FIG. 2, a rear 200 of the device 100, opposite the front 110, is illustrated. As will be apparent to those skilled in the art, devices such as the device 100 may be compatible with various accessories. Examples of such accessories include stands, docks (e.g., for affixing the device 100 to a vehicle, work surface such as a desk, or the like), carrying straps, access card readers, and the like. The device 100 can be manufactured without such accessories, and accessories can be obtained separately from the device 100 itself, for installation depending on the particular environment in which the device 100 is deployed. The device 100, therefore, includes structural features enabling the installation of various accessories.

In the illustrated example, the above-mentioned structural features include at least one mounting recess defined in an exterior surface 204 of the housing 104. In the illustrated example, the device 100 includes a plurality of sets of mounting recesses, with each set corresponding to a given accessory. For example, the device 100 includes a first set of mounting recesses 208-1 and 208-2 (also referred to as the set 208; this nomenclature is also used for other reference numerals with hyphenated suffixes herein). The set 208 can be employed to affix a bracket for a carrying strap to the housing 104. Another corresponding bracket can be affixed to the housing 104 via a second set 212 of mounting recesses 212-1 and 212-2, with a strap extending between the above-mentioned brackets. It will be apparent to those skilled in the art that any particular accessories mentioned herein are examples only. For instance, the sets 208 and 212 need not be employed to affix a carrying strap to the device 100 in other examples, nor do the sets 208 and 212 need to be employed to affix cooperating accessories such as the above-mentioned brackets.

In the present example, the device 100 also includes a set 216 of mounting recesses, including mounting recesses 216-1 and 216-2; a set 220 of mounting recesses, including mounting recesses 220-1 and 220-2; a set 224 of mounting recesses, including mounting recesses 224-1 and 224-2; a set 228 of mounting recesses, including mounting recesses 228-1, 228-2, 228-3, and 228-4; a set 232 of mounting recesses, including mounting recesses 232-1 and 232-2; and a set 236 of mounting recesses, including mounting recesses 236-1 and 236-2.

It is also contemplated that the number mounting recesses in each set is not particularly limited. Each set can include as few as one mounting recess, and can include as many recesses as is necessary to affix the relevant accessory to the device 100, e.g., with sufficient stability for use of the accessory with the device 100.

Each of the mounting recesses mentioned above is configured to receive a fastener to couple the exterior surface 204 of the device 100 to an external surface (i.e., a surface of a distinct object from the device 100), such as a surface of an accessory. The fasteners can include screws or bolts, and the mounting recesses can therefore include threaded insert nuts or other suitable openings for receiving screws or bolts. In other examples, the mounting recesses can include channels to receive press-fitting posts extending from accessories, or the like. The mounting recesses of the device 100 can include any suitable combination of mounting recess type.

The device 100 can also include further structural features enabling the installation of accessories, such as alignment recesses 240, configured to receive tabs or other protrusions on an accessory, to correctly seat the accessory against the exterior surface 204 prior to fastening of the accessory to the housing 104.

As will be apparent, the device 100 need not be used with every compatible accessory installed simultaneously (certain accessories may in fact be incompatible with one another). At any given time, therefore, some or all of the mounting recesses may be inactive and exposed to the physical environment of the device 100. Exposed mounting recesses can collect environmental contaminants such as water, dust, aerosolized organic material, or the like. Although the mounting recesses themselves may not traverse the walls of the housing 104, and may therefore not compromise an ingress protection rating of the device 100, accumulation of contaminants can nevertheless impede installation of accessories. Accumulation of certain contaminants may also lead to chemical interactions between the contaminants and the housing 104 itself, e.g., leading to damage such as cracking of the housing 104 in areas abutting the mounting recesses. Still further, exposed mounting recesses may be aesthetically undesirable, e.g., when the mounting recesses include internal metallic threads that contrast with a color and/or texture of the exterior surface 204.

The device 100 includes additional features enabling exposed mounting recesses (i.e., mounting recesses that are not currently in use to affix an accessory to the device 100) to be covered. Those additional features, described in detail below, may improve either or both of environmental resistance of the housing 104, and the aesthetic appearance of the device 100.

Figure 3:
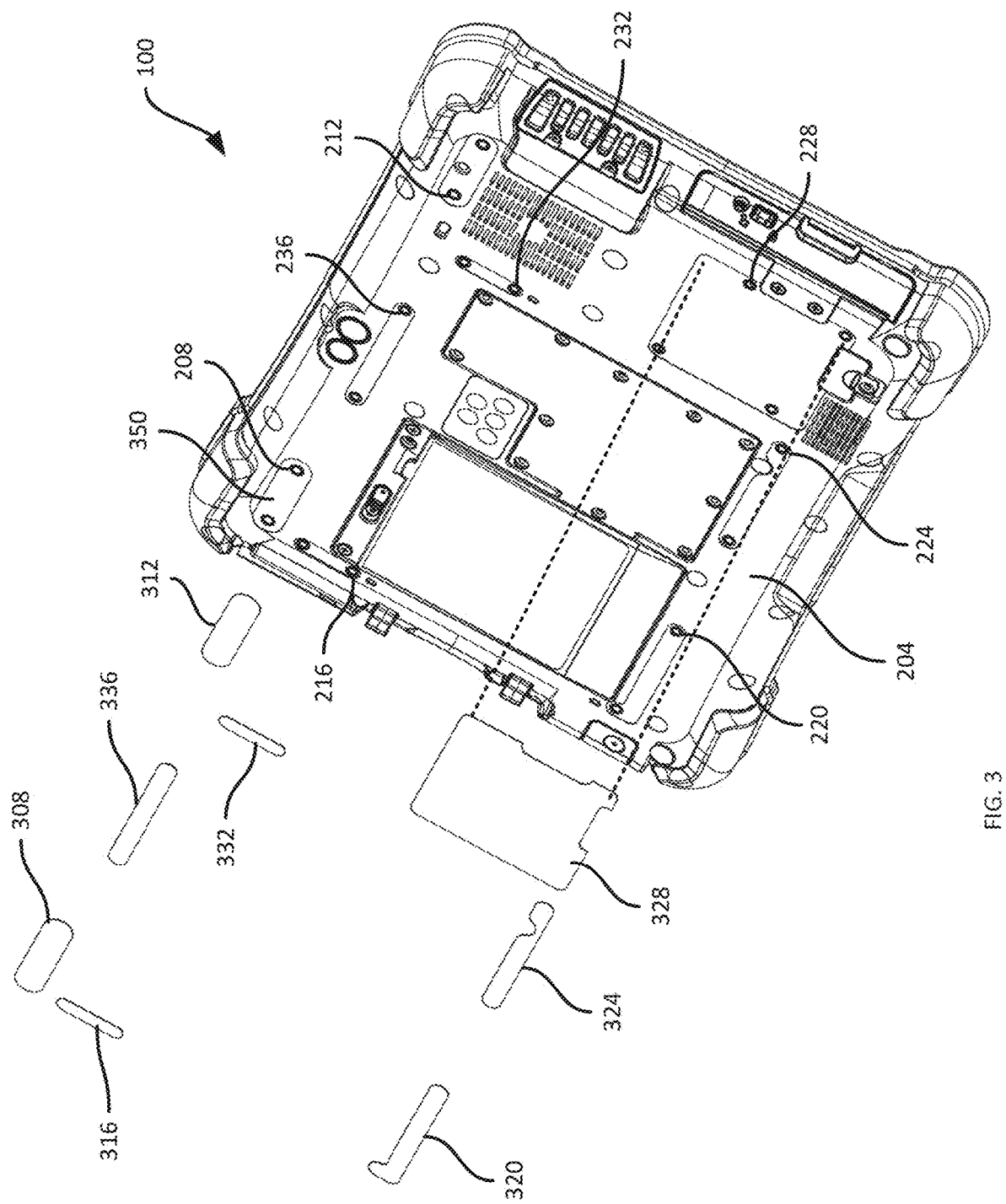
FIG. 3 is an diagram illustrating an exploded view of the device of FIGS. 1 and 2 with a set of film covers.

In particular, turning to FIG. 3, the device 100 includes at least one film cover affixed to the exterior surface 204. In the illustrated example, the device 100 includes a film cover for each of the above-mentioned sets of mounting recesses. In general, the film covers are configured to conceal the mounting recesses. Concealment can be employed to alter the appearance of the exterior surface 204 (e.g., to render exposed mounting recesses less visually prominent, or to entirely obscure exposed mounting recesses). Concealment can also be employed to mitigate against the entry of environmental contaminants into exposed mounting recesses. Further, the film covers are pierceable, e.g., by the above-mentioned fasteners. As a result, the film covers impede installation of accessories minimally or not at all.

In the present example, that is, the device 100 includes a film cover 308 corresponding to the set 208; a film cover 312 corresponding to the set 212; a film cover 316 corresponding to the set 216; a film cover 320 corresponding to the set 220; a film cover 324 corresponding to the set 224; a film cover 328 corresponding to the set 228; a film cover 332 corresponding to the set 232; and a film cover 336 corresponding to the set 236. While a distinct film cover is shown in FIG. 3 for each set of mounting recesses (e.g., one set of mounting recesses and one corresponding film cover for each compatible accessory), in other examples any given film cover can be dimensioned to conceal only part of a set of mounting recesses. In further examples, a given film cover can conceal the mounting recesses of more than one set.

As shown in FIG. 3 (e.g., for the film cover 328 and the set 228), the film covers are applied to the exterior surface 204 of the device 100, e.g., after other manufacturing and assembly processes for the device 100 are complete. The film covers can be provided in a kit, for example, corresponding to the device 100, e.g., for application by a vendor, end-user, or the like. Application of the film covers includes placing each film cover over a corresponding portion of the exterior surface that surrounds at least one of the mounting recesses. Thus, for example, the film cover 308 is affixed to a portion 350 of the exterior surface that surrounds the set 208 of mounting recesses. The portion 350 (and, as will now be apparent, respective portions of the exterior surface 204 surrounding the other sets of mounting recesses) is visible on the exterior surface 204 as a result of an indentation in the exterior surface 204, as will be discussed further below. In other examples, the above-mentioned portions need not be visually distinct from the remainder of the exterior surface 204.

The film covers can be affixed to the exterior surface 204 (or more specifically, to the portions mentioned above) by way of a suitable adhesive, such as a pressure-sensitive adhesive (PSA) applied to the film cover itself, the exterior surface 204, or both. In other embodiments, the film covers can be affixed to the exterior surface 204 via heat-based bonding, or the like.

Figure 4:
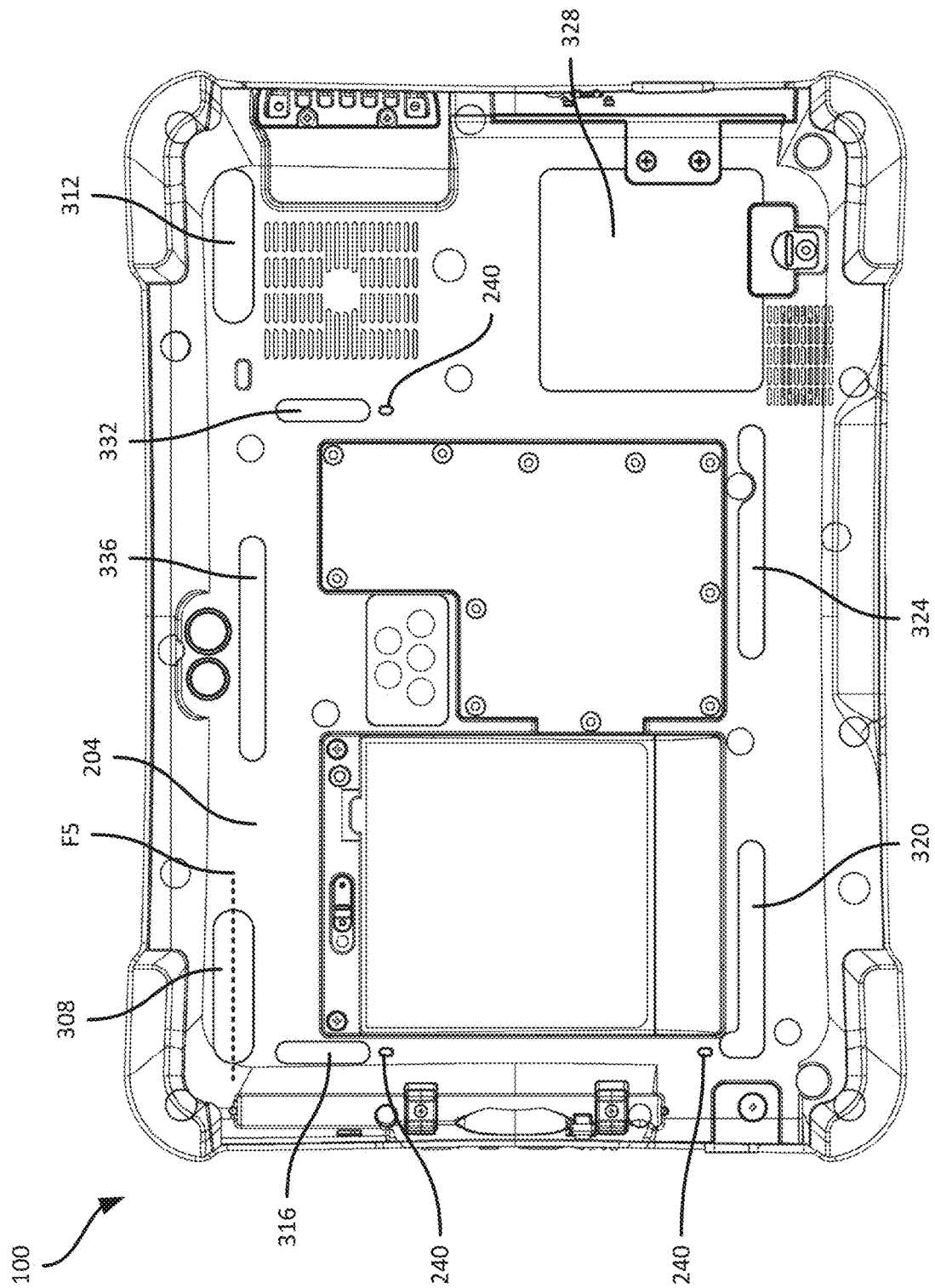
FIG. 4 is a rear view of the device of FIG. 3 in assembled form.

Turning to FIG. 4, the film covers each have a visual appearance that is distinct from the visual appearance of the underlying mounting recess. In the illustrated example in particular, upon application of the film covers to the exterior surface 204, the mounting recesses are no longer visible. The mounting recesses, in other words, can be entirely concealed by the film covers. In other examples, the mounting recesses may be partially visible through the film covers (e.g., the film covers can be translucent, or the like), although the visual appearance of the exterior surface surrounding the mounting recesses is nevertheless altered by the film covers. As will be discussed further below, the film covers can include surface treatments imparting any of a wide variety of visual appearances and/or textures to the outer surfaces of the film covers. The film covers can also be made of material(s) imparting such visual appearances and/or textures.

Figure 5:
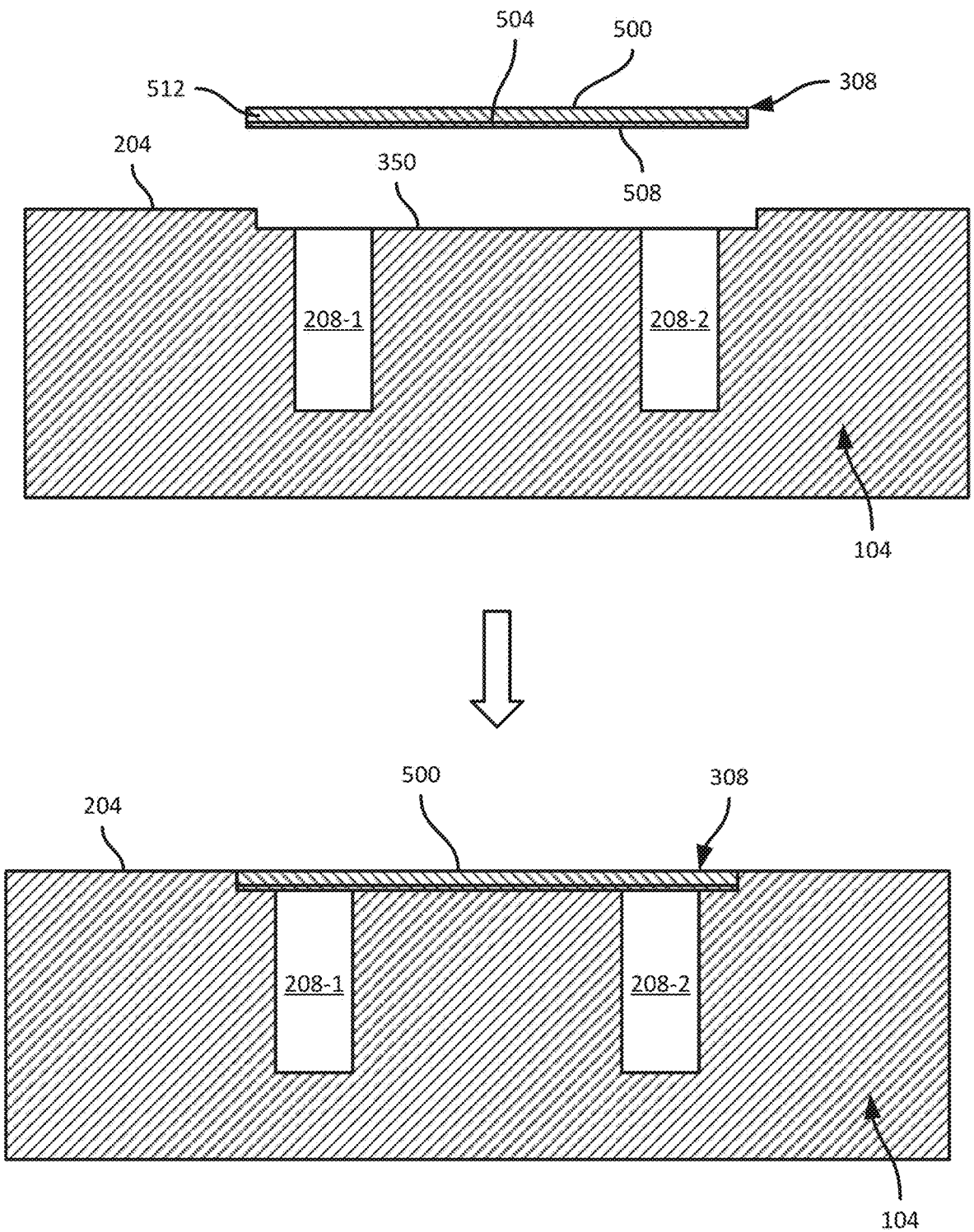
FIG. 5 is a diagram illustrating a cross section of the device of FIG. 4, taken at the section line F4.

Referring to FIG. 5, a partial cross section of the housing 104, taken at the section line F4 shown in FIG. 4, is illustrated. The mounting recesses 208-1 and 208-2 are shown extending into the housing 104, but not through the housing 104 in this example, from the exterior surface 204. In addition, the portion 350 is shown as being recessed relative to the remainder of the exterior surface 204, to a depth substantially equal to a depth of the film cover 308. As a result, as seen in the lower half of FIG. 5, when the film cover 308 is affixed to the exterior surface (specifically, to the portion 350 of the exterior surface 204), an outer surface 500 of the film cover 308 is substantially flush with the exterior surface 204 surrounding the portion 350. As will be apparent from FIG. 5, the thickness of the film cover 308 is such that in examples omitting the recession of the portion 350 (i.e., in which the portion 350 itself is flush with the remainder of the exterior surface 204), the film cover 308 may still appear substantially flush with the exterior surface 204 to an operator of the device 100.

In addition to the outer surface 500, the film cover 308 includes an inner surface 504, to which an adhesive 508 such as a PSA can be applied. For example, the film cover can be produced as an adhesive-backed compound such as a label.

The film cover 308 includes a body 512 defining the inner and outer surfaces 504 and 500. The body 512 is made of a material that, in thicknesses below about 1 mm (e.g., between about 0.1 mm and about 1 mm), is pierceable by fasteners used to install accessories on the device 100. In some examples, the force employed to pierce the film covers is substantially equal to the force employed to engage such fasteners with the mounting recesses in the absence of the film covers. In other examples, additional force to insert fasteners through a film cover, beyond that required in the absence of the film cover, may be required, however such additional force is smaller than about fifty Newton (equivalent to a mass of about 5 kg).

Various materials are contemplated for use in the body 512 of the film cover 308 (as well as any other film covers included with the device 100). For example, the body 512 can be made from a polymer film, such as a stretched polyester film (e.g., Mylar™). In other examples, the body 512 can be made from a foil tape (e.g., aluminum-based, with or without polymer coatings). In some examples, the material(s) of the body 512 render the body 512 substantially impermeable to one or more environmental contaminants (e.g., water, dust, organic material, and the like).

Figure 6:
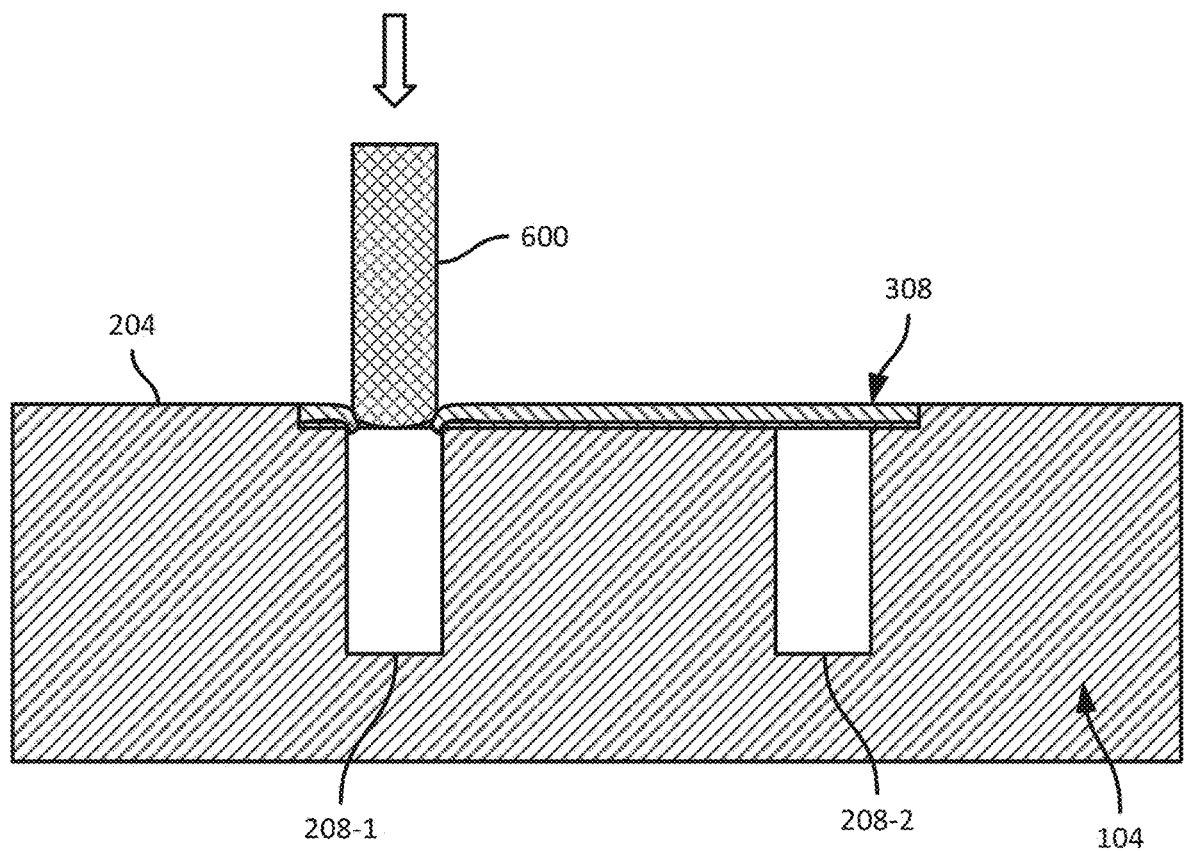
FIG. 6 is a diagram of the cross section of FIG. 5, illustrating insertion of a fastener.

Turning to FIG. 6, the cover 308 and housing 104 are shown in the same cross section as in FIG. 4, along with a fastener 600 (e.g., a screw or bolt) being engaged with the mounting recess 208-1. In particular, as seen in FIG. 6, application of the fastener 600, e.g., with a screwdriver or other hand tool, provides sufficient downwards force for the fastener 600 to pierce the film cover 308 and enable entry of the fastener 600 into the mounting recess 208-1.

Figure 7:
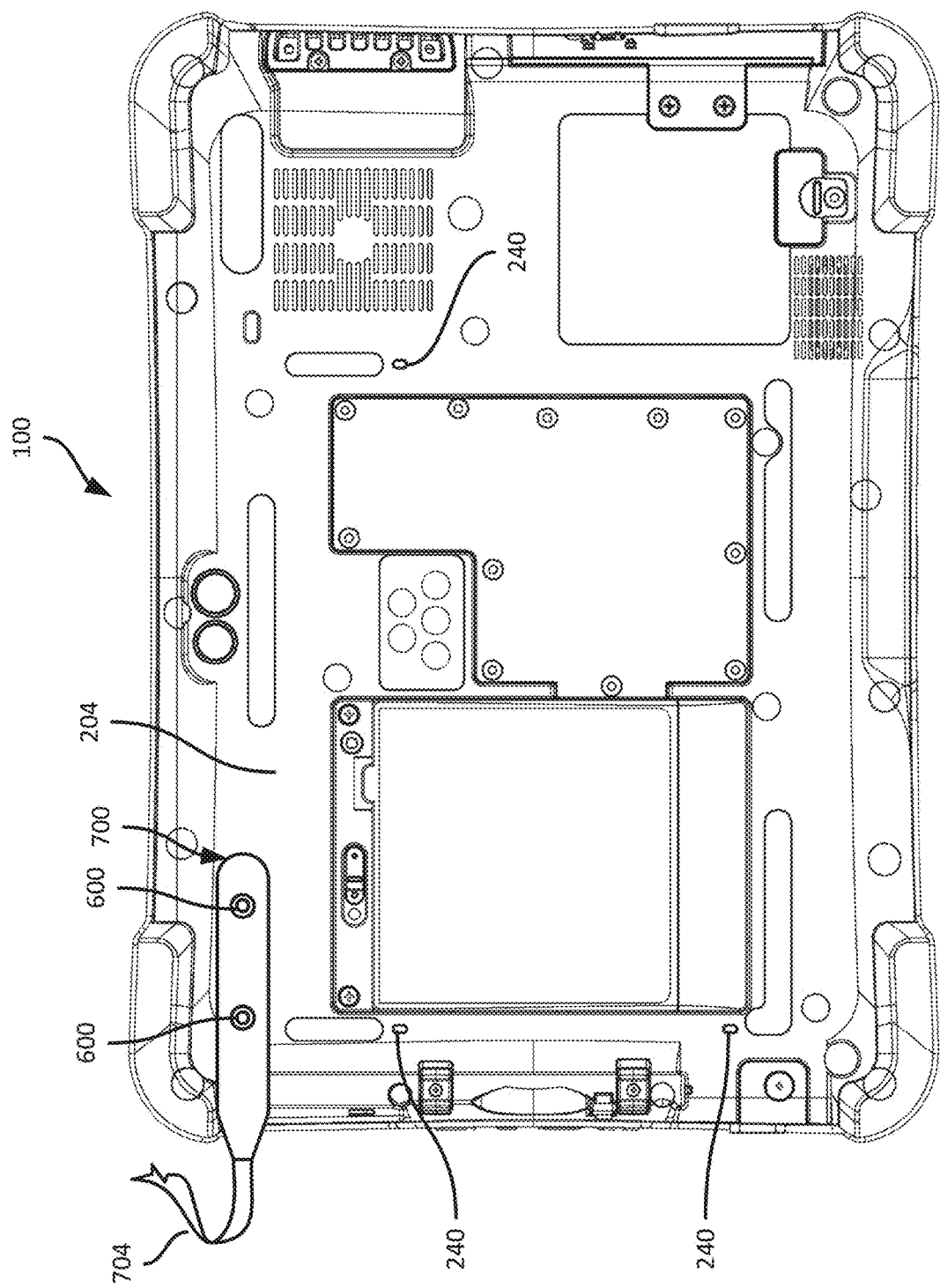
FIG. 7 is a rear view of the device of FIG. 4, with an accessory installed thereon.

FIG. 7 illustrates the device 100 following installation of an accessory over the portion 350, in the form of a bracket 700, e.g., for a carrying strap 704. To install the bracket 700, for example, the bracket 700 may be placed against the housing 104 with openings in the bracket 700 aligned with the mounting recesses 208-1 and 208-2. Alignment may be assisted by additional alignment recesses such as the recesses 240 mentioned earlier, and/or by markings on the film cover 308, as will be discussed further below.

When the bracket 700 is positioned over the film cover 308, fasteners 600 can be inserted through the bracket 700, piercing the film cover 308 and engaging with the mounting recesses 208-1 and 208-2. As a result, the bracket 700 is affixed to the housing 104, and neither the mounting recesses 208 nor the film cover 308 remain visible (both being concealed behind the bracket 700).

As will be apparent, subsequent removal of an accessory such as the bracket 700 renders the mounting recesses 208-1 and 208-2 visible, because the film cover 308 has been pierced. In some examples, additional film covers may be provided, enabling a pierced film cover to be removed and replaced, or enabling a new film cover to be placed over top of a pierced film cover.

Figure 8:
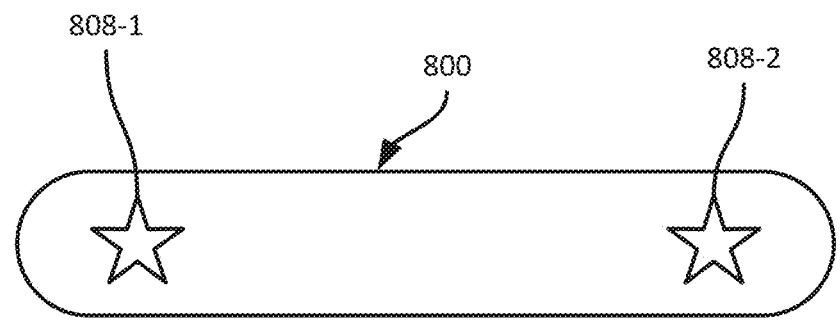
FIG. 8 is a diagram illustrating example graphical indicators on film covers.
Figure 8:
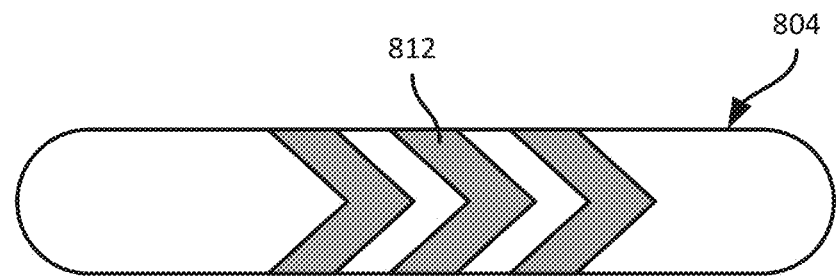

As noted above, the film covers can include surface treatments or other visual attributes on the outer surface 500 thereof, whether as a result of inherent material properties of the body 512, distinct surface treatments applied to the outer surface 500, or both. FIG. 8 illustrates a first example film cover 800, and a second example film cover 804, viewed from the outer surface thereof. The film cover 800 includes graphical indicators 808-1 and 808-2 printed, etched or otherwise applied to the outer surface. The graphical indicators 808-1 and 808-2 are visual indications of the positions of underlying (concealed) mounting recesses, when the film cover 800 has been affixed to the device 100.

Graphical indicators need not correspond to the positions of mounting recesses, however. The film cover 804, for example, includes graphical indicators 812 unrelated to mounting recess positions. The graphical indicators 812 can be ornamental, or can convey information distinct from mounting recess positions. For example, the graphical indicators 812 can include logos, coloring, text or images indicating which accessory is to be mounted using the mounting recesses concealed by the film cover 804, or any suitable combination of the above. The types of graphical indicators shown on the film covers 800 and 804 can also be combined, in other examples.

As will be apparent, the film covers can also be provided with a wide variety of other visual features, via graphical indicators or other surface treatments. For example, the film covers can have a color and/or texture that substantially matches the color and/or texture of the exterior surface 204 in some examples, to render the film covers substantially indistinguishable from the exterior surface 204 (e.g., with the exception of indicators such as those shown in FIG. 8).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A device, comprising:
a housing having an exterior surface;
a mounting recess defined in the exterior surface, the mounting recess configured to receive a fastener to couple the exterior surface of the device to an external surface;
a film cover pierceable by the fastener, the film cover having (i) an inner surface affixed to a portion of the exterior surface surrounding the mounting recess, and (ii) an opposing outer surface;
wherein the film cover comprises a material impermeable to an environmental contaminant to prevent entry of the environmental contaminant into the mounting recess.

2. The device of claim 1, wherein the opposing outer surface has a visual appearance distinct from the mounting recess.

3. The device of claim 1, wherein an outer surface of the film cover is substantially flush with the exterior surface of the housing.

4. The device of claim 1, wherein the outer surface includes a graphical indicator.

5. The device of claim 4, wherein the graphical indicator corresponds to a position of the mounting recess.

6. The device of claim 1, wherein the film cover comprises a stretched polyester film.

7. A device, comprising:
a housing having an exterior surface;
a mounting recess defined in the exterior surface, the mounting recess configured to receive a fastener to couple the exterior surface of the device to an external surface;
a film cover pierceable by the fastener, the film cover having (i) an inner surface affixed to a portion of the exterior surface surrounding the mounting recess.

8. The device of claim 7, wherein the mounting recess is a threaded insert nut configured to receive the fastener.

9. The device of claim 7, wherein an outer surface of the film cover is substantially flush with the exterior surface of the housing.

10. The device of claim 7, wherein the outer surface has a color matching the exterior surface surrounding the film cover.

11. The device of claim 7, wherein the outer surface has a color distinct from the exterior surface surrounding the film cover.

12. The device of claim 7, wherein the outer surface of the film cover includes a surface treatment rendering the outer surface visually distinct from the mounting recess.

13. The device of claim 12, wherein the surface treatment includes a surface texture substantially matching a texture of the exterior surface.

14. The device of claim 12, wherein the surface treatment includes a graphical indicator.

15. The device of claim 14, wherein the graphical indicator corresponds to a position of the mounting recess.

16. The device of claim 13, wherein the film cover comprises a polymer film.

17. The device of claim 16, wherein the film cover comprises a stretched polyester film.

18. The device of claim 13, wherein the film cover is impermeable to an environmental contaminant.

19. The device of claim 13, further comprising:
- a first set of mounting recesses, including the mounting recess, corresponding to a first accessory;
- a second set of mounting recesses corresponding to a second accessory; and
- a second film cover affixed to the exterior housing over a second portion encompassing the second set;
- wherein the portion of the exterior surface encompasses each mounting recess of the first set.

* * * * *